July 11, 1961

A. P. FRAAS ET AL 2,991,980

HEAT TRANSFER MEANS

Filed Dec. 4, 1957

INVENTORS.
Arthur P. Fraas &
BY George F. Wislicenus

ATTORNEY

July 11, 1961  A. P. FRAAS ET AL  2,991,980
HEAT TRANSFER MEANS

Filed Dec. 4, 1957  7 Sheets-Sheet 2

INVENTORS.
Arthur P. Fraas &
BY  George F. Wislicenus

ATTORNEY

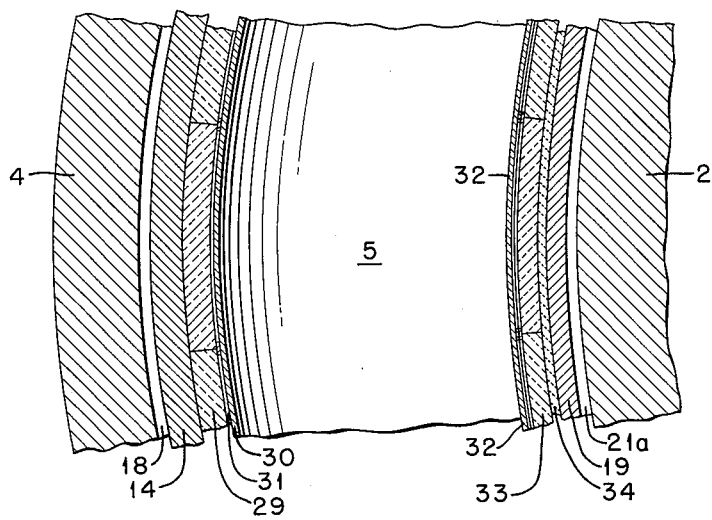
Fig. 3.
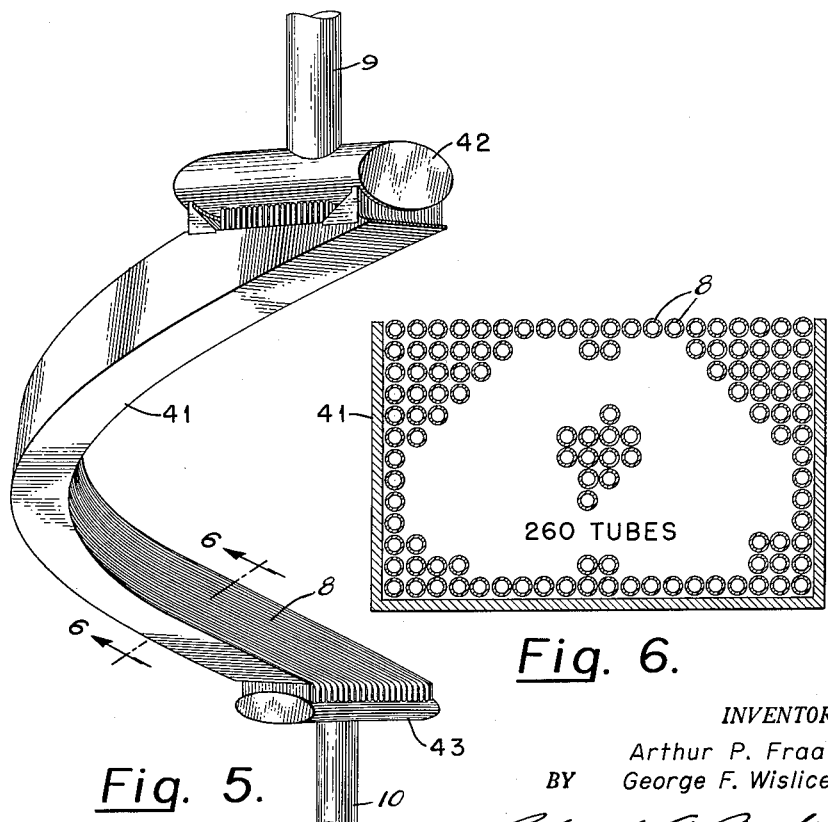
Fig. 5.
Fig. 6.
INVENTORS.
Arthur P. Fraas &
George F. Wislicenus
ATTORNEY INVENTORS.
Arthur P. Fraas &
BY George F. Wislicenus

ATTORNEY

INVENTORS.
Arthur P. Fraas &
George F. Wislicenus

ATTORNEY

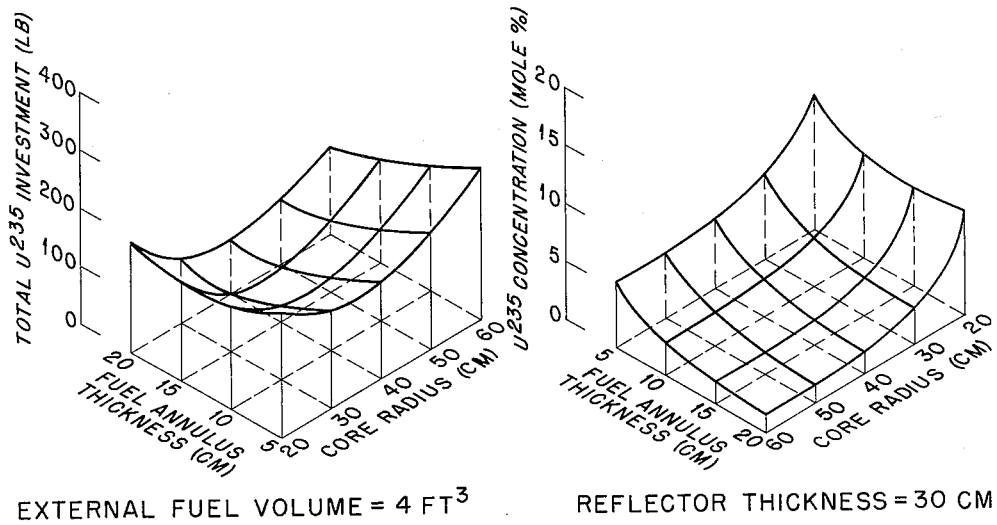
EXTERNAL FUEL VOLUME = 4 FT³
Fig. 11.
REFLECTOR THICKNESS = 30 CM
Fig. 12.
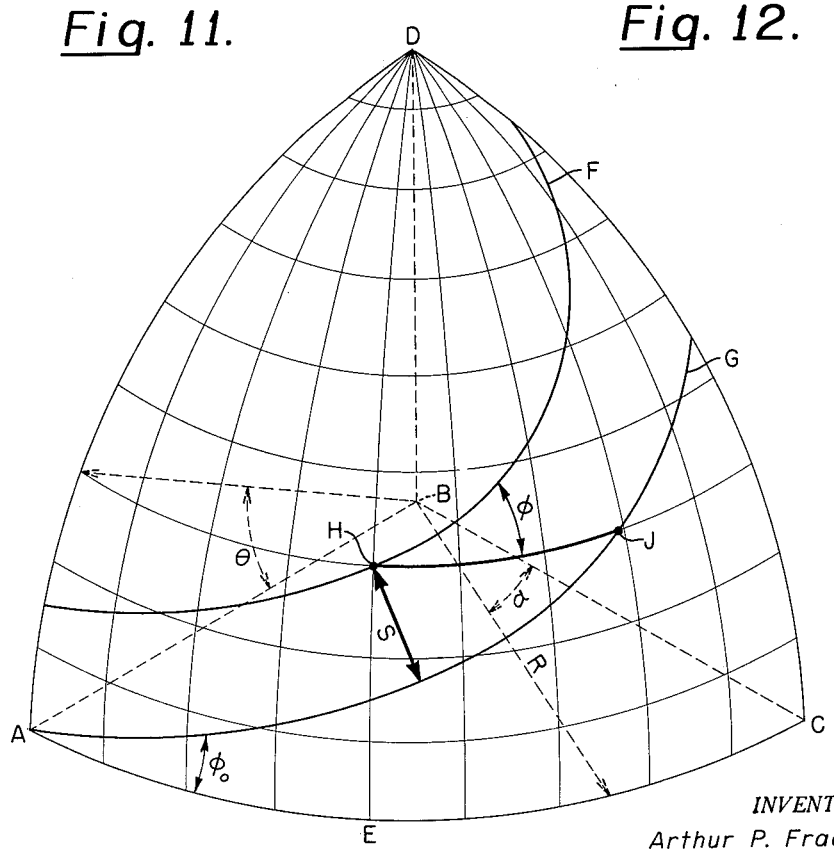
Fig. 7.
INVENTORS.
Arthur P. Fraas &
BY George F. Wislicenus
ATTORNEY United States Patent Office 2,991,980
Patented July 11, 1961

2,991,980
HEAT TRANSFER MEANS
Arthur P. Fraas, Knoxville, Tenn., and George F. Wislicenus, State College, Pa., assignors to the United States of America as represented by the United States Atomic Energy Commission
Filed Dec. 4, 1957, Ser. No. 700,721
4 Claims. (Cl. 257—198)

Our invention relates generally to the heat transfer art and more specifically to novel heat transfer means having a spherical configuration. The invention is adaptable to any situation in which heat transfer means having spherical geometry is necessary or desirable.

The physical properties of a hollow sphere attract to that shape a desirability which extends to many and varied applications. The two main properties of the hollow spherical container are: (1) a maximum volume contained by a minimum surface area, and (2) a maximum strength to withstand internal pressures for a given amount of material. These properties whether utilized separately or conjunctively become extremely important when the weight of material used in the fabrication of a containment vessel becomes a major design criterion. In many cases weight in itself is an intolerable evil but when the cost of the fabricational material is coupled with the weight consideration and the design is viewed in its broadest perspective, then the spherical configuration with its associated properties becomes a lucrative and desirable end.

In the chemical process field, high pressure reactors are often fabricated from relatively expensive materials. One can easily appreciate the saving effected by a spherical geometry over the more conventional cylindrical shape, especially in the event that a reactor is lined with platinum or other valuable material for reasons imposed by corrosive properties of the reactants.

Within the realm of nuclear energy, the spherical shape assumes a more important role, due primarily to the ability of the sphere to enclose a maximum volume with a minimum surface area. In a neutronic reactor, the loss of neutrons by leakage is related directly to the surface area of the reactor core. It is, therefore, possible to achieve criticality in a spherical reactor core with less fissionable fuel than would be required for a reactor core of any other shape using the same fissionable fuel. Since the ultimate purpose of neutronic reactors will probably be the production of useful energy, it is desirable from an economic standpoint to maintain the fuel inventory of a reactor at a minimum value. This can be accomplished by means of the spherical geometry. Associated with all power producing neutronic reactors and with most chemical reactors is the necessity of adding heat to or transferring heat from the reactor vessel. The heat transfer problem in neutronic reactors is encumbered by the possibility of radioactivity in the primary coolant of the reactor which necessitates shielding the main heat exchanger in order to protect human life which may be in the vicinity of the reactor. Since the reactor core must also be shielded, it is advantageous to maintain the primary heat exchanger of a neutronic reactor near the reactor core so that the core and the heat exchanger can be surrounded by the same shielding. Thus, it becomes desirable and in some cases even necessary to provide a heat exchanger of spherical configuration for spherical reactor vessels.

Prior to our invention, a satisfactory liquid-to-liquid spherical heat exchanger did not exist, primarily because it was not apparent how a spherical surface could be covered by heat transfer tubing while maintaining a constant center-to-center tube spacing. Constant tube spacing is required in order to assure uniform heat transfer across the entire spherical surface.

It is, therefore, a general object of our invention to provide heat transfer means adapted to lie adjacent to the wall of a spherical container.

Another object of our invention is to provide a spherical heat exchanger of the tube-and-shell type having a constant center-to-center tube spacing.

A further object of our invention is to provide a spherical heat exchanger for a neutronic reactor, the heat exchanger being adapted to surround and become an integral part of the spherical reactor core.

These and other objects of our invention will become apparent from the following detailed description of our invention taken in connection with the accompanying drawings wherein:

FIG. 3 is a vertical detail section of the fuel heat exchanger-channel space and surrounding walls, taken along line 3—3 of FIG. 1;

FIG. 5 is a pictorial view of one element of the fuel-to-secondary coolant heat exchanger;

FIG. 6 is a sectional view of one element of the fuel-secondary coolant heat exchanger;

FIG. 7 is a diagram showing two heat exchanger tubes traversing one quadrant of a hemisphere;

FIG. 11 is a graph showing the effect of reactor dimensions on total $U^{235}$ inventory required in the reactor;

FIG. 12 is a graph showing the effect of reactor dimensions upon the concentration of $U^{235}$ required in the reactor fuel;

In accordance with our invention, we provide a multiplicity of relatively small diameter tubes which lie on the surface of a sphere and traverse the spherical surface from the proximity of one pole to the proximity of the opposite pole along a path which satisfies the equation:

(1) $$\sin \phi \cos \theta = K$$

where:

$\phi$=tube inclination angle, at any point along the tube, between the tube and the latitudinal plane passing through said point;
$\theta$=latitude of said point and;
$K$=sine of the tube inclination angle at zero latitude; thereby affording a constant center-to-center spacing between tubes.

Referring to FIG. 7, which is a schematic diagram showing two tubes F and G traversing a quadrant of a hemisphere from the region of the pole O to the region of the equator AC, $\phi$ is the tube inclination angle, at point H, between the tube F and the latitudinal plane on which line HJ is located, B is the location of the center of the sphere of which ABCD is a one-eighth portion, R represents the radius of the sphere, and $\alpha$ is a typical longitudinal angle. S represents the perpendicular spacing between the tubes and $\phi_0$ is the tube inclination angle at the equator where the latitude $\theta$ is equal to zero. If N tubes are present in the sphere and S remains constant, we have found that:

$$\sin \phi_0 = \frac{SN}{2\pi R} = K$$

Since $\phi_0$ can vary only between 0 and 90°, then K can vary only between 0 and 1.

Figure 8:
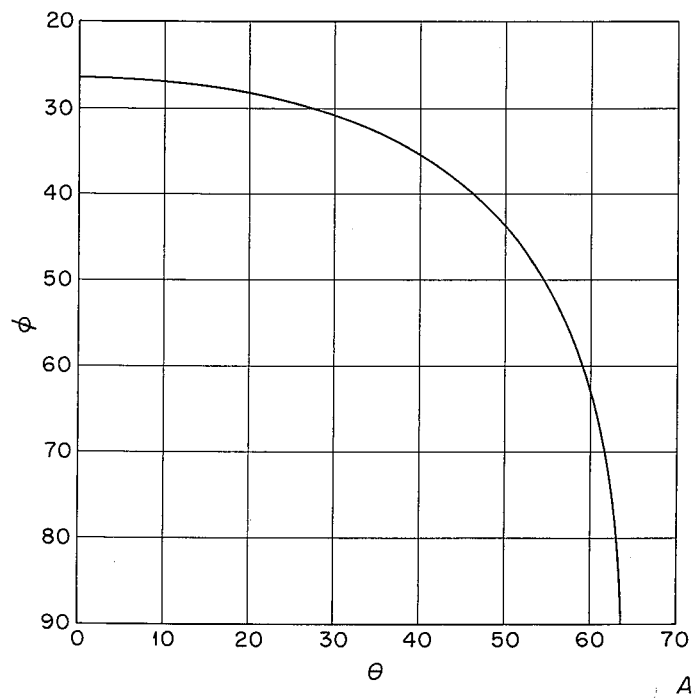
FIG. 8 is a graph relating the heat-exchanger-tube inclination angle ($\phi$) to latitude ($\theta$)

It is apparent that Equation 1 above will generate a family of curves, the position of the curve on a plot of $\phi$ vs. $\theta$ being dependent upon the value of K. For a given K, there is but one path that a heating exchanger tube can follow. FIG. 8 is a plot of $\phi$ vs. $\theta$ for a K of 0.444.

Figure 9:
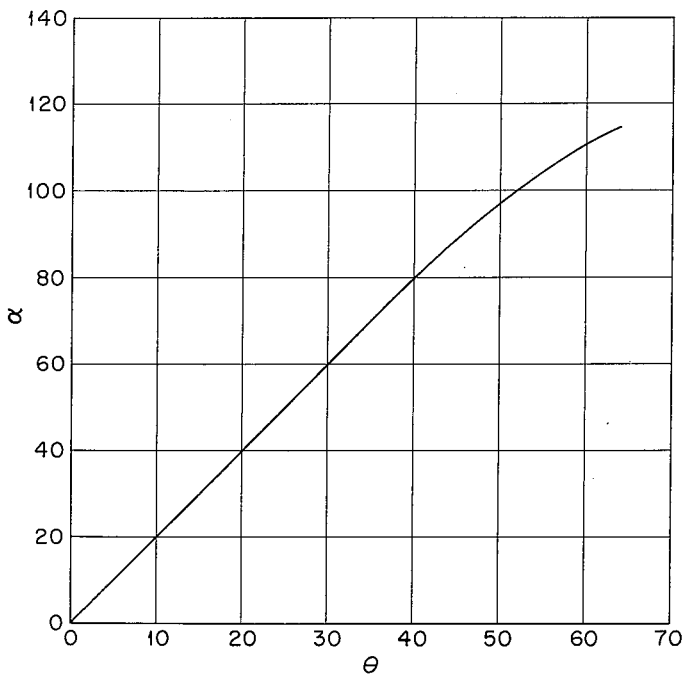
FIG. 9 is a graph relating latitude ($\theta$) to longitude ($\alpha$) for one heat exchanger.

It is obvious that there is associated with every latitude angle $\theta$, a longitude angle ($\alpha$). FIG. 9 is a plot of longitude versus latitude for a heat exchanger tube having a K equal to 0.444.

One obvious application of our invention is its incorporation into a spherical chemical reactor. Tubes can be attached to the surface of the reactor shell, either externally or internally, and a coolant circulated through the tubes, thereby cooling the reactor shell and its contents. Also, if it is desired, the heat exchanger may be maintained, within the reactor shell, at a selected distance from the shell wall by conventional supporting means. This would provide better cooling of the contents of the reactor. In addition it is possible to embed the tubes in the reactor wall, thereby making the heat transfer means an integral part of the reactor structure.

Our invention has proved to be particularly well suited for neutronic reactor applications, especially in the realm of small compact power reactors. Since the heat exchanger is spherical in configuration, it can be placed in a position surrounding the reactor core, thereby affording some degree of shielding. This dual function is most advantageous in that area of the neutronic reactor art which is concerned with the development of the propulsion reactors: it is in this area that size and weight become very important criteria. One embodiment of our heat exchanger has been successfully incorporated into the design of a circulating-fuel, reflector-moderated neutronic reactor which has been disclosed and claimed in a copending applicataion of the common assignee Ser. No. 699,428, filed November 27, 1957, in the names of Arthur P. Fraas and Carrol B. Mills for Neutronic Reactor.

Since the advantages of our heat exchanger are strikingly apparent when utilized in the above reactor, the heat exchanger will be described as it appears in that reactor.

Figure 1:
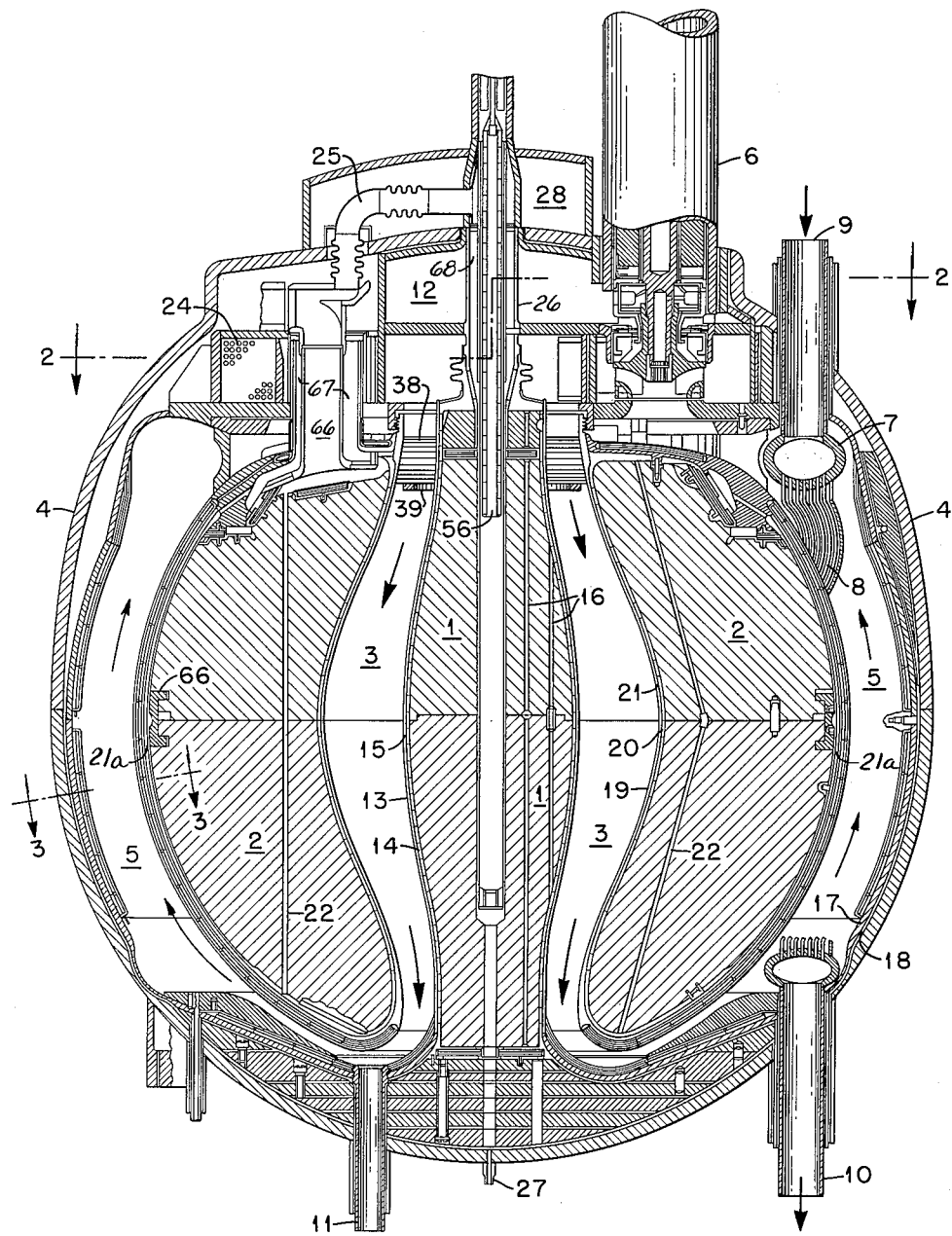
FIG. 1 is a vertical cross-section of the core of a reactor which is one embodiment of our invention, taken along line 1—1 of FIG. 2.
Figure 2:
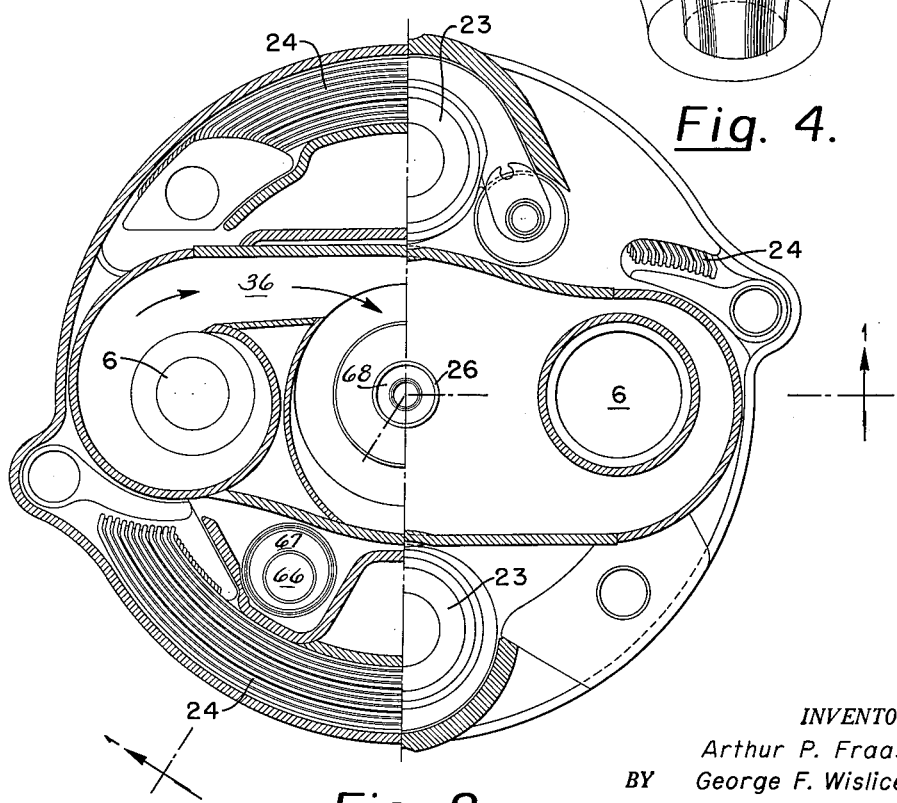
FIG. 2 is a horizontal cross-section of the pump region at the top of the reactor, taken along line 2—2 of FIG. 1.

FIG. 1 is a vertical cross-sectional view taken along line 1—1 of FIG. 2, of a reactor core utilizing our invention. The sectional cut has been made in such a way that each important component of the reactor is shown in one drawing. Actually the reactor is symmetrical about a plane passing through its center. Referring now to FIG. 1, a central island 1 of moderator material (beryllium in this example) is surrounded by a spherical mass of moderator material 2, also beryllium, thereby forming an annular fuel passageway 3. The entire assembly is surrounded by an Inconel pressure shell 4 which defines a return extension 5 of the fuel passageway 3. A fuel pump 6, communicating with the fuel passageway 3 and 5, is provided to circulate the liquid fuel downwardly through the fuel annulus 3 and then upwardly through the return fuel passageway 5. As the fuel passes downwardly through the annulus 3, a critical mass is achieved and a fission reaction is maintained at all times within the annulus. Energy is released as a result of the fission reaction and produces a temperature rise in the liquid fuel. After being heated in the fuel annulus the fuel then passes into the return passageway 5 where it is cooled by one embodiment of a spherical heat exchanger 7. The heat exchanger 7 is composed of a plurality of small Inconel tubes 8 which are wrapped around the moderator mass 2 following a helical path of varying pitch from the heat exchanger inlet 9 to the heat exchanger outlet 10. A relatively cool stream of a sodium-potassium mixture (NaK) is introduced at the heat exchanger inlet 9 and is circulated through the Inconel tubes 8 to an outlet 10. The NaK is then circulated to an external heat exchanger where it is cooled before being returned to the reactor core. After being cooled by the fuel heat exchanger 7, the fuel is returned to the fuel pump 6 to begin another flow cycle. The fuel system is provided with a fuel drain line 11 and a fuel expansion tank 12. As has been stated previously, FIG. 1 is not a sectional view taken along one vertical plane, but a sectional view along a plane selected so that all core components are cut at least once, the actual plane along which the sectional view is taken being shown as 1—1 in FIG. 2. Actually there are two fuel pumps to provide proper circulation for the entire fuel passageway.

Since the moderator bodies 1 and 2 are exposed to intense neutron and gamma radiation, internal heating occurs within these masses. In order to avoid moderator damage from excessive heating, a moderator coolant system is provided. The central island 1 is encased by and Inconel shell 13 which is held away from the island by a plurality of spacers 14, thereby defining a moderator coolant passageway 15. The island is provided with a plurality of internal passageways 16 which communicate with the wall passageway 15. Within and adjacent the outer pressure shell 4, an Inconel liner 17 is provided which, in combination with the pressure shell, defines a wall-coolant passageway 18. The passageway 18 communicates with the island passageways 15 and 16 and serves as a return line to the top of the reactor.

In an analagous manner, the outer reflector-moderator 2 is encased in an Inconel liner 19 which is maintained away from the moderator by spacers 20 thereby forming a wall passageway 21. The moderator mass 2 is also provided with a plurality of internal passageways 22 which are connected to the wall passageway 21.

All moderator-coolant passageways 15, 16, 18, 21 and 22 communicate with a moderator-coolant pump 23 (not shown in FIG. 1) and a moderator-coolant heat exchanger 24. Referring now to FIGS. 1 and 2, the operation of the moderator-coolant system will be described. The moderator-coolant (Na) leaves the pump 23 and a portion is circulated to the island through a duct 25 and a passageway 68, which is enclosed by the upper portion of the control rod thimble 26. The coolant then flows downwardly through the island passageways 15 and 16 where it is heated by the island. From the bottom of the island, the coolant is returned to the pump and heat exchanger through the pressure-shell passageway 18 where it cools the pressure shell.

The other portion of the moderator coolant is pumped to the reflector-moderator 2 through duct 66. It circulates downwardly along the portion of the passageway 21, which is adjacent the core, and downwardly through the internal passageways 22. The coolant then returns to the pump 23 and heat exchanger 24 through passageway 21a, which is an extension of passageway 21 and is adjacent the return fuel passageway 5, and through an annular passageway 67, which surrounds duct 66. At the top of the reactor, the moderator-coolant is passed over the moderator-coolant heat exchangers 24 which remove the heat from the coolant. The heat exchangers 24 are arcuate in shape, lie in a horizontal plane adjacent the pressure shell, and are fabricated from small diameter Inconel tubing. NaK flowing through the Inconel tubing serves as the secondary coolant. A moderator-coolant drain 27 is provided at the bottom of the reactor and a moderator-coolant expansion tank 28 is provided at the top of the reactor immediately above the fuel expansion tank 12. As in the case of the fuel pumps, two moderator coolant pumps are required.

FIG. 3 is a detail sectional view, taken along line 3—3 of FIG. 1, of the fuel-heat-exchanger channel space 5 and surrounding walls. The Inconel pressure shell 4 and the pressure shell liner 14 form the sodium passageway 18. Adjacent to the pressure shell liner 14 are a layer of $B_4C$ tile 29 and a boron layer 30 separated by a shim gap 31. Across the heat exchanger channel space 5 is an Inconel shell 32, another layer of $B_4C$ tile 33, a layer of copper-$B_4C$ cermet 34, the Inconel liner 19 and the beryllium reflector mass 2. The moderator-coolant passageway 21 is formed by shell 19 and the moderator mass 2. The boron containing layers are supplied for shielding purposes.

Figure 4:
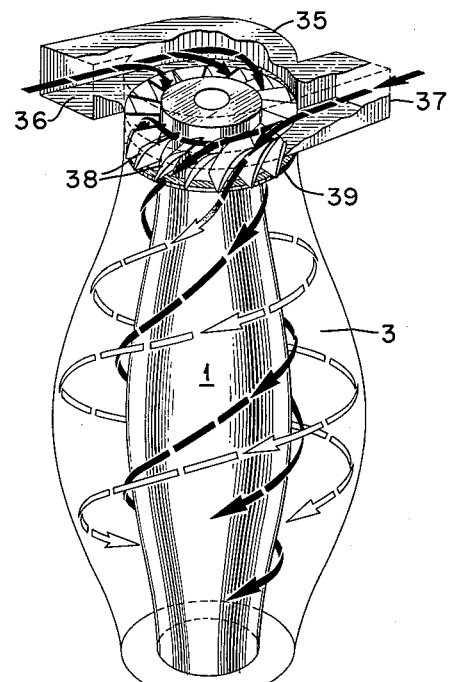
FIG. 4 is a pictorial view of the fuel annulus of the reactor showing the header arrangement at the inlet to the fuel annulus.

Referring now to FIG. 4 which is a detailed view of the fuel annulus 3 and the header arrangement 35, the ends 36 and 37 of the inlet header 35 are connected to the outlets of the fuel pumps 6, as is illustrated by reference numeral 36 in FIG. 2. It can be seen that the fuel annulus is a divergent-convergent annular passageway which is symmetrical about a horizontal equatorial plane. The annulus is formed by the surfaces of the reflector-moderator body 2 and the island 1, the surfaces being surfaces of revolution generated by cosine curves. Table I below gives the horizontal radii of the annulus at various latitudes.

TABLE I

| No. of Inches Above Equator Towards Inlet | Radius of Island from Centerline in Inches | Radius of Outer Annulus Wall (core) in Inches |
|---|---|---|
| 18 | 3.405 | 5.500 |
| 17 | 3.405 | 5.628 |
| 16 | 3.405 | 5.805 |
| 15 | 3.435 | 6.025 |
| 14 | 3.515 | 6.295 |
| 13 | 3.627 | 6.610 |
| 12 | 3.780 | 6.958 |
| 11 | 3.962 | 7.327 |
| 10 | 4.160 | 7.730 |
| 9 | 4.380 | 8.140 |
| 8 | 4.600 | 8.551 |
| 7 | 4.785 | 8.952 |
| 6 | 4.943 | 9.322 |
| 5 | 5.085 | 9.663 |
| 4 | 5.195 | 9.955 |
| 3 | 5.275 | 10.186 |
| 2 | 5.338 | 10.355 |
| 1 | 5.370 | 10.453 |
| Equator or 0 | 5.376 | 10.500 |

Since the power of the reactor is generated within the fuel annulus, good flow characteristics are necessary in order to avoid areas of stagnation which would yield local overheating of the fuel. In a divergent passageway, the flow of fluid is subject to separation and reversal of boundary layers. In order to avoid this problem, guide vanes 38, shown in FIG. 4, have been provided to reduce the swirling motion imparted to the incoming fuel by the fuel pumps. A sufficient volume of fuel is supplied to the header immediately above the guide vanes so that the header remains filled with a rotating fuel supply. The guide vanes impart a swirl to the fuel so that the fuel traverses the annulus in a path as shown by the arrows in FIG. 4. In addition to guide vanes, a drag ring 39 is added on the underside of the vanes in order to eliminate flow reversal along the island wall. Although this embodiment is shown with a continuous annular portion, the principles of our invention are retained in reactors having fuel channels which have longitudinal separators.

Referring now to FIG. 5 which is a view of one element of a fuel to NaK heat exchanger, which is identified by reference numeral 7 in FIG. 1, and to FIG. 6, which is a sectional view of FIG. 5, a plurality of Inconel tubes 8, to which reference was made in the description of FIG. 1, are enclosed by an Inconel channel 41. The tubes terminate in headers 42 and 43, header 42 being the inlet and header 43 being the outlet. Fuel enters the inlet header 42 through inlet tube 9 and leaves the outlet header 43 through outlet tube 10. The heat exchanger is designed to fit closely around the outer extremity of a sphere, therefore a view of the heat exchanger looking along a line parallel to the axis of either the inlet pipe or the outlet pipe would show the channel as an arcuate member. Actually, the channel follows a helical path of variable pitch, the pitch being selected so that the tube spacing will be uniform irrespective of latitude. FIGS. 5 and 6 show a bundle containing 260 tubes arranged rectangularly in a 13×20 tube pattern. Twelve bundles of this type are used in the reactor, the bundles being disposed in such a way that inlet tubes 9 and outlet tubes 10 lie on 30° centers about the reactor center within the annular passageway 5 and are substantially parallel to the vertical center-line of the island 1.

A condition of constant tube spacing irrespective of latitude will exist when the helical path satisfies the equation:

$$\sin \phi \cos \theta = K$$

where:

$\phi$ = tube inclination angle, at any point along the tube, between the tube and the latitudinal plane passing through that point;
$\theta$ = latitude of said point; and
$K$ = constant.

FIG. 7 shows the angles $\phi$ and $\theta$ referred to above. F and G are two parallel tubes traversing the spherical section.

Referring now to FIG. 8, the angle $\phi$, which is the angle between the tube and a plane of latitude at any point along the tube, is shown as a function of the latitude $\theta$. Using FIG. 8 conjunctionally with FIG. 9, which shows the tube longitude $\alpha$ as a function of latitude $\theta$, the heat exchanger configuration can be plotted. The critical dimensions of the fuel-to NaK heat exchanger are given in Table II of this application.

Figure 10:
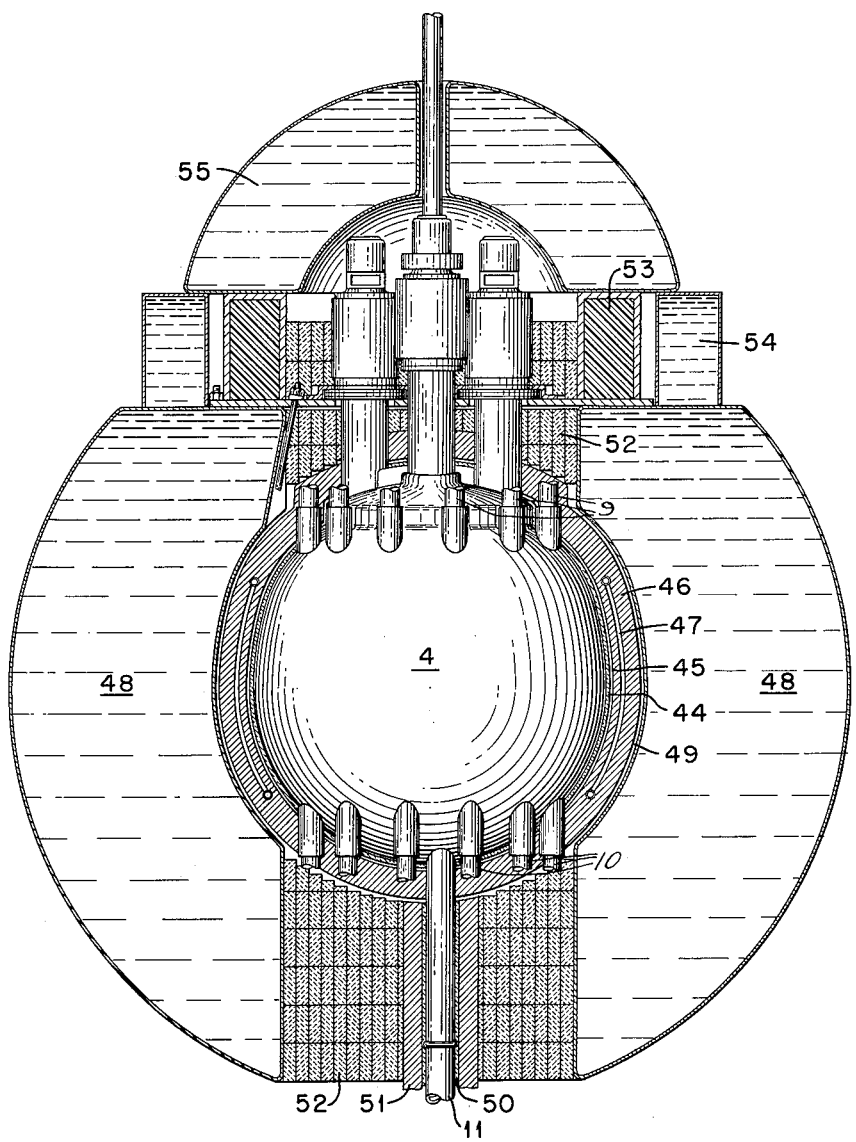
FIG. 10 is a vertical cross-section of the reactor shielding.

Referring now to FIG. 10 which is a vertical section through the shield, the reactor core, encased by the pressure shell 4, is surrounded by one-half inch of thermal insulation 44. Immediately around the thermal insulation is a one-half inch air gap 45 which is in turn surrounded by a 4.3 inch thick lead gamma-ray shield 46. Passageways 47 are provided in the lead shield for cooling water. The lead shield is enclosed by a 33 inch thick layer of borated water 48 which is separated from the lead shield by a one-half inch air gap 49. The fuel drain line 11 is shielded by a one-half inch layer of thermal insulation 50, a three inch thick lead gamma-ray shield 51, and a layer of hexagonal cans filled with LiOH 52. The top of the reactor is shielded by canned LiOH 52, a layer of paraffin 53, a ten inch thick borated water shield 54, and an eighteen inch thick borated water shield 55. In this particular reactor, the borated water is contained in aluminum tanks.

The shielding of this reactor is simplified because of the unique design of the fuel heat exchangers. Being disposed in a layer around the active core, the fuel heat exchangers function as a shield, thereby reducing the amount of shielding necessary on the outside of the pressure shell. The material in the heat exchanger shell is about 70% as effective as water for the removal of fast neutrons. The shielding is designed to give 10 r/hr. at a point fifty feet from the center of the reactor core.

Critical dimensions of this one embodiment of a reactor and its accessories are given in Table II below.

TABLE II

*Reactor dimensions*

REACTOR-CROSS SECTION EQUATORIAL RADII (IN.)

Control rod thimble 26:
Inside _____ 0.750
Thickness _____ 0.062
Outside _____ 0.812

Sodium passage 68:
- Inside _____ 0.912
- Thickness _____ 0.130
- Outside _____ 0.942

Beryllium island 1:
- Inside _____ 0.942
- Thickness _____ 4.121
- Outside _____ 5.063

Sodium passage 15 at island:
- Inside _____ 5.063
- Thickness _____ 0.188
- Outside _____ 5.251

Inconel shell 13:
- Inside _____ 5.251
- Thickness _____ 0.125
- Outside _____ 5.376

Fuel passageway 3:
- Inside _____ 5.376
- Thickness _____ 5.124
- Outside _____ 10.500

Outer core shell 19:
- Inside _____ 10.500
- Thickness _____ 0.125
- Outside _____ 10.625

Sodium passage 21 at island:
- Inside _____ 10.625
- Thickness _____ 0.188
- Outside _____ 10.813

Beryllium reflector 2:
- Inside _____ 10.813
- Thickness _____ 10.855
- Outside _____ 21.668

Sodium passage 21a:
- Inside _____ 21.668
- Thickness _____ 0.125
- Outside _____ 21.793

Inconel shell 19:
- Inside _____ 21.793
- Thickness _____ 0.240
- Outside _____ 22.033

Stainless-steel-clad copper $B_4C$ cermet 34:
- Inside _____ 22.033
- Stainless steel thickness _____ 0.010
- Copper-$B_4C$ thickness _____ 0.080
- Stainless steel thickness _____ 0.010
- Outside _____ 22.133

Stainless-steel-canned $B_4C$ 33:
- Can—
  - Inside _____ 22.133
  - Thickness _____ 0.005
  - Outside _____ 22.138
- $B_4C$ tile—
  - Inside _____ 22.138
  - Thickness _____ 0.240
  - Outside _____ 22.378
  - Shim gap _____ 0.029
- Can—
  - Inside _____ 22.407
  - Thickness _____ 0.005
  - Outside _____ 22.412
  - Shim gap _____ 0.021

Outer reflector shell 32:
- Inside _____ 22.433
- Thickness _____ 0.062
- Outside (max.) _____ 22.495

Channel 41, inner rail of _____ 22.500
Tangent to first tube _____ 22.510
Tube radius _____ 0.115
Center line, first tube _____ 22.625
Twelve spaces at 0.250 _____ 3.000
Center line, thirteenth tube _____ 25.625
Tube radius _____ 0.115
Circle tangent to thirteenth tube _____ 25.740
Spacer _____ 0.008
Gap _____ 0.022

Channel 41, outer rail of:
- Inside _____ 25.770
- Thickness _____ 0.120
- Outside _____ 25.890

Gap:
- Inside _____ 25.890
- Thickness _____ 0.030
- Outside _____ 25.920

Boron jacket 30:
- Inside _____ 25.920
- Thickness _____ 0.062
- Outside _____ 25.982

$B_4C$ tile 29:
- Inside _____ 25.982
- Thickness _____ 0.328
- Outside _____ 26.310

Pressure shell liner 14:
- Inside _____ 26.310
- Thickness _____ 0.375
- Outside _____ 26.685

Sodium gap 18:
- Inside _____ 26.685
- Thickness _____ 0.125
- Outside _____ 26.810

Pressure shell 4:
- Inside _____ 26.810
- Thickness _____ 1.000
- Outside _____ 27.810

*Core*

Diameter (inside of outer shell at equator), in ___ 21
Island outside diameter, in _____ 10.75
Core inlet outside diameter, in _____ 11
Core inlet inside diameter, in _____ 6.81
Core inlet area, in.$^2$ _____ 58.7
Core equatorial cross-sectional area, in.$^2$ ____ 256.2

*Fuel annulus measurements*

| No. of Inches Above Equator Towards Inlet | Radius of Island from Centerline in Inches | Radius of Outer Annulus Wall (core) in Inches |
|---|---|---|
| 18 | 3.405 | 5.500 |
| 17 | 3.405 | 5.628 |
| 16 | 3.405 | 5.805 |
| 15 | 3.435 | 6.025 |
| 14 | 3.515 | 6.295 |
| 13 | 3.627 | 6.610 |
| 12 | 3.780 | 6.958 |
| 11 | 3.962 | 7.327 |
| 10 | 4.160 | 7.730 |
| 9 | 4.380 | 8.140 |
| 8 | 4.600 | 8.551 |
| 7 | 4.785 | 8.952 |
| 6 | 4.943 | 9.322 |
| 5 | 5.085 | 9.663 |
| 4 | 5.195 | 9.955 |
| 3 | 5.275 | 10.186 |
| 2 | 5.338 | 10.355 |
| 1 | 5.370 | 10.453 |
| Equator or 0 | 5.376 | 10.500 |

*Reflector-moderator region*

Volume of beryllium plus fuel, ft.$^3$ _____ 28.2
Volume of beryllium only, ft.$^3$ _____ 24.99
Cooling passage diameter, in _____ 0.187
Number of passages in island _____ 120
Number of passages in reflector _____ 288

*Fuel system*

Fuel volume, ft.$^3$:
- In 36-in.-long core _____ 3.21
- In inlet and outlet ducts _____ 1.410
- In expansion tank when ½ in. deep _____ 0.08
- In heat exchanger _____ 2.84
- In pump volutes _____ 0.84
- Total in main circuit _____ 8.38

Fuel expansion tank:
- Volume (8%), ft.³ -------------------- 0.5787
- Width, in. ---------------------------- 13.625
- Length, in. --------------------------- 32.500

Sodium system

Sodium volume, ft.³:
- In expansion tank ---------------------- 0.16
- In annular passage at pressure shell --- 1.60
- In reflector passages (total) ---------- 0.90
- In first deck ------------------------- 0.47
- In pump and heat exchanger ------------ 0.35
- In second deck ------------------------ 0.42
- In island passages (total) ------------ 0.44
- Total in main circuit ----------------- 4.34
- Inside diameter of sodium transfer tube to reflector, in. -- 2.375
- Inside diameter of sodium transfer tube from reflector, in. -- 3.875
- Inside diameter of sodium transfer tube to island, in. -- 1.437
- Area of sodium passage to reflector, in.² ---- 4.426
- Area of sodium passage from reflector, in.² -- 5.847
- Area of sodium passage to island, in.² ------ 1.619

Fuel-to-NaK heat exchanger

- Tube center-line-to-center-line spacing, in. ----- 0.250
- Tube outside diameter, in. --------------- 0.229 to 0.231
- Tube inside diameter, in. ---------------- 0.180
- Tube wall thickness, in. ---------------- 0.025
- Tube spacer thickness, in. -------------- 0.020
- Mean tube length, in. ------------------- 65.000
- Equatorial crossing angle --------------- 26°20
- Inlet and outlet pipe inside diameter, in. ---- 2.469
- Inlet and outlet pipe outside diameter, in. --- 2.875
- Number of tube bundles ------------------ 12
- Number of tubes per bundle, 13×20 ------ 260
- Total number of tubes ------------------- 3120
- Center-line radius of NaK inlet pipes --- 19.590
- Center-line radius of NaK outlet pipes -- 19.590

Sodium-to-NaK heat exchanger

- Tube center-line-to-center-line spacing, in. ----- 0.2175
- Tube outside diameter, in. -------------- 0.1875
- Tube inside diameter, in. --------------- 0.1375
- Tube wall thickness, in. ---------------- 0.025
- Tube spacer thickness, in. -------------- 0.030
- Mean tube length, in. ------------------- 28
- Number of bundles ----------------------- 2
- Number of tubes per bundle, 15×20 ------ 300
- Total number of tubes ------------------- 600
- Inlet and outlet pipe inside diameter, in. ---- 2.469
- Inlet and outlet pipe outside diameter, in. --- 2.875

Pump-expansion tank region

Vertical distance above equator, in.:
- Floor of fuel pump inlet passage -------- 17.625
- Bottom of lower deck ------------------- 19.125
- Top of lower deck ---------------------- 19.656
- Bottom of upper deck ------------------- 24.000
- Center line of fuel pump discharge ----- 21.437
- Center line of sodium pump discharge --- 26.125
- Top inside of fuel expansion tank ------ 29.25
- Inside of dome ------------------------- 29.875
- Outside of dome ------------------------ 30.875
- Top inside of sodium expansion tank ---- 34.312
- Top outside of sodium expansion tank --- 34.812
- Top of fuel pump mounting flange ------- 47.000
- Top of sodium pump mounting flange ----- 50.243

Dome radius, in.:
- Inside --------------------------------- 29.875
- Outside -------------------------------- 30.875

Fuel pumps

- Center-line-to-center-line spacing, in. ----- 21
- Volute chamber height, in. ------------- 4.375
- Estimated impeller weight, lb. --------- 11
- Critical speed, r.p.m. ----------------- 6000+
- Shaft diameter, in. -------------------- 2.250
- Shaft overhang, in. -------------------- 14.750
- Distance between bearings, in. --------- 12
- Impeller diameter, in. ----------------- 5.750
- Impeller discharge height, in. --------- 1.000
- Impeller inlet diameter, in. ----------- 3.500
- Shaft length (over-all), in. ----------- 31½
- Shaft outside diameter between bearings, in. ---- 2⅜
- Lower bearing journal outside diameter, in. ---- 3.400
- Shaft outside diameter below seal, in. ---- 2¼
- Thrust bearing height from equator, in. ---- 48.125
- Number of vanes in impeller ------------ 5
- Diameter of top positioning ring, in. -- 6.200
- Diameter of bottom positioning ring, in. -- 6.190
- Outer diameter of top flange, in. ------ 10.000

Sodium pump

- Center-line-to-center-line spacing, in. ----- 23.000
- Volute chamber height, in. ------------- 2.500
- Estimated impeller weight, lb. --------- 10
- Critical speed, r.p.m. ----------------- 6000+
- Shaft diameter, in. -------------------- 2.250
- Center-line lower bearing to center-line impeller, in. -- 13.3
- Distance between bearings, in. --------- 12
- Impeller diameter, in. ----------------- 5.750
- Impeller discharge height, in. --------- 0.250
- Impeller inlet diameter (ID), in. ------ 3.500
- Shaft length (over-all), in. ----------- 31.5
- Shaft outside diameter between bearings, in. ---- 2.375
- Lower bearing journal outside diameter, in. ---- 3.400
- Shaft outside diameter below seal, in. ---- 2.25
- Thrust bearing height above equator, in. ---- 51.907
- Number of impeller vanes --------------- 10
- Diameter of top positioning ring, in. -- 6.200
- Diameter of bottom positioning ring, in. -- 6.190
- Outside diameter of top flange, in. ---- 10.000

The dimensions given in Table II are the dimensions of a preferred embodiment, but changes can be made to suit each reactor application. FIG. 12 is a three dimensional graph showing the relationship between fuel-annulus thickness, core radius, and $U^{235}$ concentration required for criticality. These relationships are plotted for reactors having a constant reflector thickness of 30 cm. It can be seen that the $U^{235}$ concentration necessary for criticality increases with a decrease in either or both of the other variables. It has been discovered that any decrease from a reflector thickness of 30 cm. results in an increase in the $U^{235}$ concentration required. An increase in the reflector thickness from 30 cm. has little effect on the uranium concentrations as compared to the 30 cm. reflector-thickness values.

FIG. 11 is a graph showing the effect of reactor dimensions on total $U^{235}$ investment. The data are plotted for an external fuel volume of four cubic feet. External fuel volume is that volume of fuel which occupies the space in the reactor which is external to the fuel annulus. The external volume includes the heat exchanger volume, pump volumes, and the volume of the fuel expansion tank. An inspection of FIG. 11 reveals that an optimum point exists at a fuel annulus thickness of 15 cm. and a core radius of approximately 30 cm. It is to be understood that the optimum point as illustrated in FIG. 11 may not be an optimum point for all reactor applications. For example, an aircraft designer may be willing to accept a higher uranium investment in order to obtain a reactor having a smaller core radius. In terms of operability of the reactor in any given application, it is quite possible that the optimum point for that application may be the worst point in terms of uranium investment. FIGS. 11 and 12 are not given in order to define specific ranges of operability of our invention, but are given as merely illustrative examples of the effect of reactor dimensions on other reactor variables.

Reverting now to FIG. 1, a control or regulating rod 56, driven by conventional means is provided. Control of this reactor is unique in that a master-slave relationship between the load and the reactor makes the reactor virtually self-controlling. Operating at the design point, a decrease in the load on the reactor will effect a temperature rise which will in turn cause a thermal expansion of the liquid fuel. The expansion of the fuel will result in a decrease in the reactivity in the reactor, thereby dropping the temperature back to the design level. An increase in the load on the reactor would initiate a chain of circumstances which would lead to eventual adaptation of the reactor to the new increased load in an analogous manner. The control or regulating rod 56 is used in this reactor mainly for adjusting the operating temperature of the reactor and for overriding neutron poisons which may be built up as a consequence of operation. In addition, the control system is so designed that if the temperature of the fuel exceeds 1600° F. the rod will be inserted automatically to halt the reaction.

Heat generated in the reactor and subsequently transferred to the secondary coolant (NaK), which circulates through heat exchangers 24 and 7, may be removed in any manner compatible with the end result toward which the reactor is applied. For example, the hot secondary coolant may be used to generate high pressure steam with which electrical power can be generated. If the reactor is adapted for aircraft propulsion, a turbo-prop cycle can be used. In this cycle, the secondary coolant is circulated through radiators, through which air may be directed by a compressor. Energy is transferred to the air by the hot radiator and the resultant high pressure on the reactor. Energy to heat the system to 1200° F. is provided in part by the NaK pumping power with the remainder being provided by any convenient external means such as electrical heaters. During the heating period, sodium is added to the reflector-moderator coolant system when the system is at 350° F. The sodium pumps are then started and the reactor is heated to the 1200° F. point.

Figure 13:
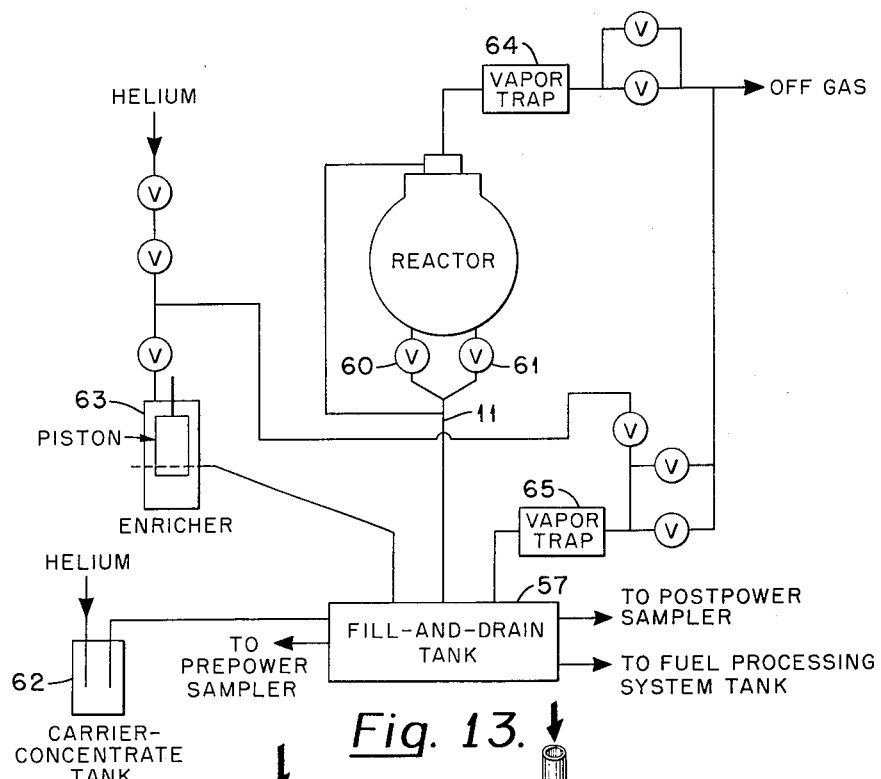
FIG. 13 is a schematic flow diagram of the fuel fill-and-drain system.
Figure 14:
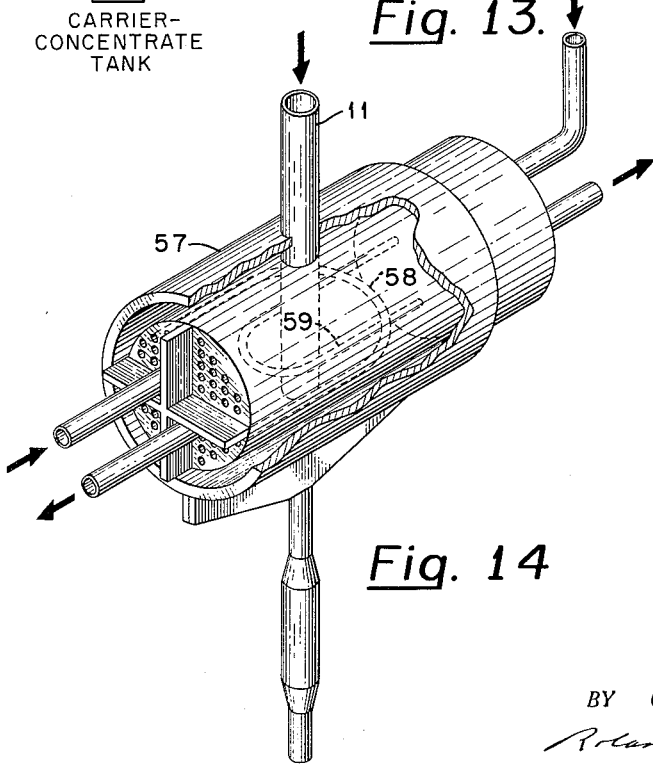
FIG. 14 is a pictorial view of the reactor fuel fill-and-drain tank.

Referring now to FIG. 13 which is a schematic drawing of the fuel fill-and-drain system and to FIG. 14 which is a pictorial view of the fill-and-drain tank, the fuel drain lines 11 are shown leaving the bottom of the reactor and entering the fuel fill-and-drain tank 57. Two coolant lines 58 and 59 are shown within the tank. The fuel drain line 11 enters the tank at the top and terminates within the tank shell. Returning now to FIG. 13, dump valves 60 and 61 are provided in the fuel drain lines 11 immediately below the reactor. The drain system is designed so that the reactor can be drained by gravity in three minutes even in the event that one dump valve fails to operate. A tank 62 is included in the system for the introduction of the barren fuel carrier ($NaZnF_5$) and initial batch of concentrate ($Na_2UF_6$).

One fuel which is suitable for use in this reactor is a mixture containing 50 mole percent NaF, 46 mole percent $ZrF_4$, and 4 mole percent $UF_4$, which is, essentially, a solution of $Na_2UF_6$ in $NaZnF_5$. It has been discovered that fuels containing an alkali fluoride, zirconium tetrafluoride, and either uranium tetrafluoride or uranium trifluoride will function as a fuel for reactors of this type. Table III lists the physical properties of several representative fuels. A more complete description of the properties of fluoride fuels may be found in the co-pending application of the comon assignee, Serial No. 600,639 (48), filed July 27, 1956, in the names of Charles J. Barton and Warran R. Grimes for "Reactor Fuel Composition", now Patent No. 2,920,024, issued January 5, 1960.

TABLE III

*Physical properties of representative fuels*

| Composition, Mole percent | Approximate Melting Point, °C. | Heat Capacity, cal./gm. °C. | Thermal Conductivity, B.t.u./hr. ft.² (° F./ft.) | Viscosity, Centipoises | | Density, gm./cc. (T=° C.) |
|---|---|---|---|---|---|---|
| | | | | | °C. | |
| $NaF$—50<br>$ZrF_4$—46<br>$UF_4$—4 | 520 | 0.26 at 700° C. | 1.5 | 9.3<br>6.05<br>4.25 | 600<br>700<br>800 | =3.93—.00093 T |
| $NaF$—53.5<br>$ZrF_4$—40<br>$UF_4$—6.5 | 540 | 0.24 | 1.2 | 8.5<br>5.6<br>4.0 | 600<br>700<br>800 | =4.04—.0011 T |
| $LiF$—55<br>$NaF$—20<br>$ZrF_4$—21<br>$UF_4$—4 | 545 | 0.33 | | 12.0<br>7.0<br>4.45 | 600<br>700<br>800 | =3.49—.00085 T |
| $RbF$—48<br>$ZrF_4$—48<br>$UF_4$—4 | 425 | 0.21 | 1.2 | 7.2<br>4.7<br>3.3 | 600<br>700<br>800 | =4.00—.00093 T |
| $NaF$—50<br>$ZrF_4$—25<br>$UF_4$—25 | 610 | 0.27 | | 8.5<br>5.0<br>3.5 | 700<br>800<br>900 | =5.09—.00159 T |
| $KF$—50.1<br>$NaF$—4.8<br>$ZrF_4$—41.3<br>$UF_4$—3.8 | 540 | 0.28 | | | | =4.27—.00163 T | air is then allowed to expand through a turbine which extracts the energy of the air and utilizes a portion of this energy to drive the compressor. A propeller which is attached to the turbine shaft, is turned by the turbine, thereby effecting a means for driving the aircraft. Also, a turbo jet cycle may be utilized. In this arrangement, the heated air is passed through a turbine which is only large enough to drive the compressor. The turbine extracts only a portion of the total available energy so that the remainder can be used to develop a thrust as the high pressure gas is exhausted in a rearward direction from the aircraft.

In operation of the reactor, the secondary coolant system is filled with the coolant (NaK) and the NaK pumps are started. This operation is performed with no load An enricher 63 is supplied for subsequent additions of $Na_2UF_6$. A portion of the off-gas system is shown in FIG. 13. Vapor traps 64 and 65 are included to trap out $ZrF_4$ from the gaseous fission products which are diluted by helium before introduction into the off-gas system. After passing through the $ZrF_4$ traps, the off-gases are sent to a charcoal adsorption bed (not shown) where they are detained until the radioactivity is at a safe level for discharge into the air.

Returning now to the description of the opertion of the reactor, the barren fuel carrier is introduced to the system by means of tank 62, after the system has reached an isothermal condition at 1200° F. The fuel carrier is then pressurized into the reactor core where it is circulated by the fuel pumps. After the system has been degassed by circulation, the dump valves 60 and 61 are opened and the fuel carrier is allowed to enter the fill-and-drain tank. A small amount of the fuel concentrate, which carries the $U^{235}$, is added to the fuel carrier at this point and the mixture is again pressurized into the reactor core. By opening the dump valves and pressurizing alternately, the carrier and concentrate are mixed. Further additions of concentrate are made at the enricher in small increments until criticality is achieved with the control rod partially withdrawn. The control rod is then partially withdrawn to allow the reactor to reach the designed mean-fuel-temperature and a load is gradually applied to the reactor by circulating air through the radiators. After the design temperture has been reached, the control rod is inserted to a position such that the effective multiplication factor of the system is equal to unity. By inserting the control rod 56, thereby lowering the fuel temperature to 1200° F., and removing the load at this temperature, the reactor can be shut down and the fuel dumped. The reactor has been designed to achieve criticality with 23 kg. of $U^{235}$ in the channel 3 with a total $U^{235}$ inventory of 64 kg. These values are included in the design data and operating specifications of the reactor as given below in Table IV.

TABLE IV

POWER

| | |
|---|---|
| Design heat output (kw.) | 60,000. |
| Core heat flux | Heat transported out by circulating fuel. |
| Core power density (max./avg.) | 2:1. |
| Power density, maximum (kw. per liter of core) | 1,300. |
| Specific power (kw. per kg. of fissionable material in core) | 940. |
| Power generated in reflector (kw.) | 2,040. |
| Power generated in island (kw.) | 600. |
| Power generated in pressure shell (kw.) | 210. |
| Power generated in lead layer (kw.) | 132. |
| Power generated in water layer (kw.) | 4. |

MATERIALS

| | |
|---|---|
| Fuel | NaF–ZrF₄–UF₄ (50–46–4 mole percent). |
| Reactor structure | Inconel. |
| Moderator | Beryllium. |
| Reflector | Do. |
| Shield | Lead and borated water. |
| Primary coolant | The circulating fuel. |
| Reflector coolant | Sodium. |
| Secondary coolant | NaK. |

FUEL SYSTEM PROPERTIES

| | |
|---|---|
| Uranium enrichment (percent $U^{235}$) | 93.4. |
| Critical mass (kg. of $U^{235}$) | 23. |
| Total uranium inventory (kg. of $U^{235}$) | 64. |
| Consumption at maximum power (g./day) | 88. |
| Design lifetime (hr.) | 1,500. |
| Design time at maximum power (hr.) | 500. |
| Burnup in 500 hr. at maximum power (percent) | 2.9. |
| Fuel volume in core (ft.³) | 3.2. |
| Total fuel volume (ft.³) | 10. |

NEUTRON FLUX DENSITY IN CORE

| | |
|---|---|
| $10^4$ ev. $<E<10^7$ ev. (neutrons·cm.⁻²·sec.⁻¹) | $3 \times 10^{15}$. |
| Thermal $<E<10^4$ ev. (neutrons·cm.⁻²·sec.⁻¹) | $1 \times 10^{15}$. |
| Thermal, maximum (neutrons·cm.⁻²·sec.⁻¹) | $2 \times 10^{14}$. |
| Thermal, average (neutrons·cm.⁻²·sec.⁻¹) | $5 \times 10^{13}$. |

CONTROL

| | |
|---|---|
| Shim control | One rod of 5% $\Delta k/k$. |
| Rate of withdrawal | $3.3 \times 10^{-4}$ $\Delta k/k$·sec. |
| Temperature coefficient (over-all) | $-2.3 \times 10^{-5}$ $(\Delta k/k)/°F$. |
| Temperature coefficient (fast) | $-5 \times 10^{-6}$ $(\Delta k/k)/°F$. |
| Thermal fissions (percent) | 40. |
| Neutron leakage (percent) | 32. |
| Prompt neutron lifetime (sec.) | 400. |
| $k_{eff}$ (clean, as loaded) | 1.04. |
| $\Delta k$ (temperature) | 0.004. |
| $\Delta k$ (poisons) | 0.036. |
| $k_{eff}$ (hot and poisoned) | 1.00. |
| Conversion ratio | 0. |

CIRCULATING FUEL COOLANT SYSTEMS

| | |
|---|---|
| Fuel in core: | |
| Outlet temperature (° F.) | 1,600. |
| Temperature rise (° F.) | 350. |
| Means flow velocity (f.p.s.) | 5. |
| Reynolds number (for mean axial velocity) | 85,000. |
| Fuel-to-NaK heat exchanger: | |
| Volume of fuel (ft.³) | 2.45. |
| Volume of NaK in tubes (ft.³) | 2.97. |
| Volume of Inconel in tubes (ft.³) | 1.88. |
| Inconel tube surface in contact with fuel (ft.²) | 903. |
| Heat exchanger thickness (in.) | 3.25. |

| | Fuel | NaK Coolant |
|---|---|---|
| Maximum temperature (° F.) | 1,600 | 1,500 |
| Temperature drop (or rise) (° F.) | 350 | 430 |
| Pressure drop (p.s.i.) | 39 | 13 |
| Flow rate (ft.³/sec.) | 2.96 | 10.45 |
| Velocity through the tube matrix (f.p.s.) | 8.77 | 24 |
| Reynolds number | 3,740 | 120,000 |
| Heat transfer coefficient (B.t.u./hr.·ft.²·° F.) | 2,215 | 10,000 |

| | |
|---|---|
| Cooling system for NaK-fuel coolant: | |
| Maximum air temperature (° F.) | 750. |
| Ambient airflow through NaK radiators (c.f.m.) | 243,000. |
| Radiator air pressure drop (in. H₂O) | 9. |
| Blower power required (total for four blowers) (H.P.) | 600. |
| Total radiator inlet face area (ft.²) | 100. |
| Cooling system for moderator: | |
| Maximum temperature of sodium (° F.) | 1,250. |
| Sodium temperature drop in heat exchanger (° F.) | 200. |
| NaK temperature rise in heat exchanger (° F.) | 250. |
| Pressure drop of sodium in heat exchanger (p.s.i.) | 7. |
| Pressure drop of NaK in heat exchanger (p.s.i.) | 7. |
| Flow rate of sodium through reflector (ft.³/sec.) | 1.35. |
| Flow rate of sodium through island and pressure shell (ft.³/sec.) | 0.53. |
| Flow velocity of sodium through reflector and island (f.p.s.) | 30. |
| Reynolds number of sodium in reflector and island | 170,000. |

The above described reactor may be fabricated in any convenient manner but one convenient assembly scheme is the assembly of the reactor from five major subassemblies. In this embodiment the five major components are the reflector-moderator (reference number 2 in FIG. 1); the main heat exchanger (reference number 7 in FIG. 1); the north head (the assembly shown in FIG. 2); the island (reference number 1 in FIG. 1) and south pressure-shell liner assembly (reference numeral 14 in FIG. 1); and the pressure shell (reference numeral 4 in FIG. 1).

The reflector-moderator 2 is composed of two beryllium hemispheres held together by a ring 66 as shown in FIG. 1. The Inconel liners and boron shielding is placed around the sphere of beryllium to complete the reflector-moderator sub-assembly.

Next, the north head is assembled from the Inconel structural materials, sodium to NaK heat exchangers (reference numeral 24), the fuel and sodium pumps, and the core entrance header. The reflector-moderator sub-assembly and the north head are then welded together while holding the fuel heat exchanger in place around the outer periphery of the reflector moderator.

Next, the island and south pressure-shell liner are fabricated. The island is composed of upper and lower beryllium sections joined at the reactor equator. The upper and lower sections are fitted together and the Inconel shell, held away from the beryllium by spacers, is fitted over the beryllium. An equatorial weld in the Inconel shell completes the island fabrication. The south pressure-shell liner with the shells containing the shielding (reference numerals 14, 29, 30, and 31 in FIG. 3) is then welded to the island to form the fourth subassembly. The island is inserted through the reflector and the north portion of the pressure-shell liner is welded at the equator to the south portion. The pressure shell, in two hemispherical sections, is then placed around the reactor and welded at the equator.

The above description of one assembly scheme is not complete but it is merely a brief outline of one assembly procedure. It is obvious that other schemes are available and deviations will be apparent to one skilled in the art.

The specific reactor embodiment described above is suitable for the propulsion of an aircraft of the Douglas C-133A type. The important specifications for the C-133A are given in Table V below.

TABLE V

C-133A specifications

| | |
|---|---|
| Over-all length | 153 ft. |
| Over-all wingspan | 180 ft. |
| Maximum gross weight | 282,000 lb. |
| Normal gross weight | 255,000 lb. |
| Empty weight | 109,417 lb. |

Power plant (four used):

| | |
|---|---|
| Type | Turboprop. |
| Designation | P&W-T-34-P3. |
| Rated power | 5700 eshp. |
| Weight (less tailpipe) | 2564 lb. |
| Fuel capacity | 16,000 gal. |

If it is desired, chemically fueled engines may be used in addition to the nuclear engines for safety reasons. Auxiliary chemical engines will afford a factor of safety so that the nuclear aircraft will not have to rely entirely on nuclear power in its initial test. In addition the chemical engines may be used for rapid acceleration.

A propulsion plant comprising four turboprop engines, each rated at 5700 eshp, is suitable for use with the above-described reactor embodiment. In addition, four J-47 chemical turbojet engines may be included for the auxiliary services outlined above. Table VI below is a weight estimate of a nuclear-powered C-133A.

TABLE VI

Weight estimate of nuclear C-133A

| | Weight (lb.) |
|---|---|
| Airframe, less engines | 99,161 |
| Engines: 4 turboprop at 4270 lb. | 17,080 |
| Radiators: 4 at 1297 lb. | 5,188 |
| NaK piping | 3,429 |
| Reactor (including intermediate heat exchanger, pressure shell, fuel pumps etc.) | 14,000 |
| NaK pumps and drives | 6,000 |
| Reactor shield | 48,000 |
| Crew shield | 27,000 |
| Increase in structural weight | 10,000 |
| Empty weight of nuclear powered C-133A | 229,858 |
| Installed weight of four J-47 engines | 14,000 |
| Empty weight of C-133A aircraft plus nuclear power plant and auxiliary chemical engines | 243,858 |

Table VII gives the payload estimates for the C-133A. It can be seen that the nuclear-powered C-133A will carry a substantial payload, even with auxiliary chemical power.

TABLE VII

Payload estimate of nuclear C-133A

| | Maximum Payload, (lb.) | Normal Payload, (lb.) |
|---|---|---|
| C-133A with nuclear | 52,142 | 25,142 |
| C-133A with nuclear and auxiliary chemical power | 38,142 | 11,142 |

As we stated previously, the heat exchanger embodiment which was incorporated in the above-described reactor was composed of twelve bundles of the type shown in FIGS. 5 and 6, the bundles being disposed on 30° centers about the reactor center. Clearly, this arrangement is merely one adaptation of our invention to one particular neutronic reactor. It is apparent that many modifications and changes can be made within the scope of our invention. For example, the heat exchanger described above could have been composed of a continuous multiplicity of tubes arranged uniformly within the annular passageway of the reactor without segregating the tubes into bundles as shown. The heat exchanger can be made of any convenient material and fabricated in any convenient manner. Any method of tube forming can be used, such as bending the tubes to fit the configuration of a forming die, and conventional welding techniques are applicable. In certain applications the tubes can be made an integral part of the reactor vessel by attaching the tubes to the vessel or embedding them in the reactor walls. While the dimensions given herein may be critical to the design of the described reactor embodiment, they are not germane to the present invention. Over-all size of a heat exchanger fabricated according to our invention is clearly not critical.

Since the above-described embodiment of our heat transfer means was offered for illustrative purposes only, it should not be interpreted in a manner which would limit our invention. Our invention should be limited only as indicated in the appended claims.

Having thus described our invention, what is claimed as novel is:

1. Heat transfer means adapted to lie in the proximity of the wall of an essentially spherical vessel in heat-transfer relationship with the contents of said spherical vessel comprising a multiplicity of relatively small diameter tubes disposed in substantially uniform array in the proximity of said vessel wall, all of said tubes extending from the proximity of one polar extremity of said vessel to the proximity of the opposite polar extremity in parallel relationship with a variable-pitch spiral path, all parts of which spiral path lie on the surface of said spherical vessel and satisfy the equation:

$$\cos \theta \sin \phi = K$$

where:

$\phi$ = the tube inclination angle, at any point along the tube, between the tube and the latitudinal plane passing through said point;

$\theta$ = the latitude of said point and $K$ = sine of the tube inclination angle at zero latitude;

thereby affording a constant center-to-center spacing between any two of said tubes, independent of vessel latitude, means disposed in the proximity of one of said polar extremities to allow ingress of a heat transfer medium to the interior of said tubes from a position external to said vessel, and means disposed in the proximity of the opposite polar extremity to allow egress of said heat transfer medium from the interior of said tubes to a position external to said vessel.

2. The heat transfer means of claim 1 wherein said tubes are an integral part of the walls of said vessel.

3. Heat transfer means comprising a first liquid-retaining shell of configuration approximating the surface of a sphere, a second liquid-retaining shell of configuration approximating the surface of a smaller sphere, disposed substantially-concentrically within said first shell, inlet port means, at one polar extremity of said pair of concentric shells, for introduction of a stream of a first liquid into the annulus formed between said pair of shells, outlet port means at the opposite polar extremity of said pair of shells, for the egress of said stream of first liquid from said annulus, a multiplicity of tubes disposed in substantially uniform array within said annulus, with all of said tubes extending from the proximity of one of said polar extremities of the annulus to the proximity of the opposite polar extremity, and, in the proximities of each of such polar extremities, being disposed in liquid-conducting communication with the exterior of said annulus through tube-sheet relationship with at least one of said shells, and multiplicity of tubes thereby being adapted to conduct the flow of a second liquid therethrough, in heat transfer relationship with said first liquid flowing within said annulus, and with each of said tubes extending from the proximity of one polar extremity to the proximity of the opposite polar extremity along a path parallel to a variable-pitch spiral path, all parts of which spiral path lie on the surface of one of said spherical shells and satisfies the equation:

$$\cos\theta \sin\phi = K$$

where:

$\phi$ = the tube inclination angle, at any point along the tube, between the tube and the latitudinal plane passing through said point;
$\theta$ = the latitude of said point and;
$K$ = sine of the tube inclination angle at zero latitude;

thereby affording a constant center-to-center spacing between any two of said tubes independent of latitude within said annulus.

4. Heat transfer means comprising a first liquid-retaining shell of configuration approximating the surface of a sphere, a second liquid-retaining shell of configuration approximating the surface of a smaller sphere, disposed substantially-concentrically within said first shell, inlet port means, at one polar extremity of said pair of concentric shells, for introduction of a stream of a first liquid into the annulus formed between said pair of shells, outlet port means, at the opposite polar extremity of said pair of shells, for egress of said stream of first liquid from said annulus, a multiplicity of tubes disposed in substantially uniform array in said annulus, all of said tubes extending from the proximity of one of said polar extremities of the annulus to the proximity of the opposite polar extremity, a plurality of headers each accepting in tube-sheet relationship one of the pair of extremities of a plurality of said tubes and each having a liquid conducting duct, said ducts extending, in liquid-tight relationship, through a respective aperture in one of said shells, in the proximity of each of said polar extremities of said annulus, thereby affording liquid-conducting communication therethrough of the interior of said tubes with the exterior of said annulus, each of said tubes extending from the proximity of one polar extremity of said annulus to the proximity of the opposite polar extremity along a path parallel to a variable-pitch spiral path, all parts of which spiral path lie on the surface of one of said shells and satisfies the equation:

$$\sin\phi \cos\theta = K$$

where:

$\phi$ = the tube inclination angle, at any point along the tube, between the tube and the latitudinal plane passing through said point;
$\theta$ = the latitude of said point and;
$K$ = sine of the inclination angle at zero latitude;

thereby affording a constant center-to-center spacing between any two of said tubes independent of latitude, within said annulus, said annulus thereby being adapted to conduct a stream of a first liquid entering through said inlet port means, flowing through said annulus in the interstitial space between the multiplicity of tubes, and leaving through said outlet port means and said multiplicity of tubes thereby being adapted to conduct a flow of a second liquid therethrough in heat transfer relationship with said first liquid flowing within said annulus.

References Cited in the file of this patent
UNITED STATES PATENTS

| | | |
|---|---|---|
| 2,249,051 | Schulze | July 15, 1941 |
| 2,545,371 | Majonnier et al. | Mar. 13, 1951 |
| 2,772,860 | Nelson | Dec. 4, 1956 |